(12) United States Patent
Schreier et al.

(10) Patent No.: US 11,458,787 B2
(45) Date of Patent: Oct. 4, 2022

(54) SAFETY CONNECTOR APPARATUS FOR TRAILER HITCHES

(71) Applicants: Ryan B. Schreier, Plymouth, MN (US); Charles B. Reinken, Shakopee, MN (US)

(72) Inventors: Ryan B. Schreier, Plymouth, MN (US); Charles B. Reinken, Shakopee, MN (US)

( * ) Notice: Subject to any disclaimer, the term of this patent is extended or adjusted under 35 U.S.C. 154(b) by 0 days.

(21) Appl. No.: 16/875,489

(22) Filed: May 15, 2020

(65) Prior Publication Data

US 2020/0361259 A1 Nov. 19, 2020

Related U.S. Application Data

(60) Provisional application No. 62/849,001, filed on May 16, 2019.

(51) Int. Cl.
*B60D 1/28* (2006.01)
*B60D 1/60* (2006.01)
*B60D 1/06* (2006.01)

(52) U.S. Cl.
CPC .............. *B60D 1/28* (2013.01); *B60D 1/06* (2013.01); *B60D 1/60* (2013.01)

(58) Field of Classification Search
CPC ............. B60D 1/28; B60D 1/583; B60D 1/60
USPC ......................................................... 280/507
See application file for complete search history.

(56) References Cited

U.S. PATENT DOCUMENTS

| 2,834,611 | A | | 5/1958 | Chenette | |
|---|---|---|---|---|---|
| 3,917,315 | A | | 11/1975 | Ostebee et al. | |
| 4,032,171 | A | | 6/1977 | Allen et al. | |
| 4,208,065 | A | * | 6/1980 | Hansen | B60D 1/583 |
| | | | | | 280/507 |
| 5,378,008 | A | | 1/1995 | Mccrossen | |
| 5,476,281 | A | | 12/1995 | Worthington | |
| 5,700,024 | A | * | 12/1997 | Upchurch | B60D 1/60 |
| | | | | | 280/507 |
| 5,947,504 | A | | 9/1999 | Milazzo | |
| 6,312,004 | B1 | | 11/2001 | Kiss | |
| 6,382,657 | B1 | | 5/2002 | Lynn et al. | |
| 6,666,051 | B1 | * | 12/2003 | Li | B60D 1/60 |
| | | | | | 280/507 |
| 6,722,686 | B2 | * | 4/2004 | Koy | B60D 1/06 |
| | | | | | 280/507 |
| 6,802,523 | B1 | * | 10/2004 | Profitt | B60D 1/025 |
| | | | | | 280/432 |

(Continued)

OTHER PUBLICATIONS

"Non-Final Office Action," for U.S. Appl. No. 16/208,281 dated Oct. 14, 2020 (12 pages).

(Continued)

*Primary Examiner* — Jacob B Meyer
*Assistant Examiner* — Hosam Shabara
(74) *Attorney, Agent, or Firm* — Pauly, DeVries Smith & Deffner LLC

(57) ABSTRACT

A ball-style hitch safety connector apparatus with a spoon safety connector made, as well as alternative designs, is disclosed herein. In an embodiment a spoon element is secured on the underside of the hitch, the spoon element including a spoon- or cup-shaped portion along with a handle. This spoon element presses up on the bottom of the ball assembly, in particular the underside where the nut and bolt are located that secure the ball to in place.

10 Claims, 19 Drawing Sheets

(56) References Cited

U.S. PATENT DOCUMENTS

| | | | |
|---|---|---|---|
| 6,932,376 B1 | 8/2005 | Profitt | |
| 6,962,361 B1 | 11/2005 | Price | |
| 7,121,121 B2 | 10/2006 | Wyers | |
| 8,313,119 B2 | 11/2012 | Frantz | |
| 8,840,130 B2 | 9/2014 | Columbia | |
| 9,296,269 B1 * | 3/2016 | Riibe | B60D 1/065 |
| 9,630,463 B2 | 4/2017 | Columbia | |
| 9,855,804 B1 * | 1/2018 | Kirkconnell | B60D 1/28 |
| 10,471,784 B1 * | 11/2019 | Herlihy | B60D 1/06 |
| 11,034,202 B2 * | 6/2021 | Schreier | B60D 1/28 |
| 2012/0032416 A1 | 2/2012 | Frantz | |
| 2014/0167391 A1 | 6/2014 | Elliott et al. | |
| 2015/0123379 A1 * | 5/2015 | Yuan | B60D 1/60 |
| | | | 280/507 |
| 2019/0168554 A1 | 6/2019 | Reinken | |

OTHER PUBLICATIONS

"Notice of Allowance," for U.S. Appl. No. 16/208,281 dated Feb. 25, 2021 (7 pages).

"Response to Non-Final Rejection," dated Oct. 14, 2020 for U.S. Appl. No. 16/208,281, submitted via EFS-Web on Feb. 16, 2021, 8 pages.

* cited by examiner

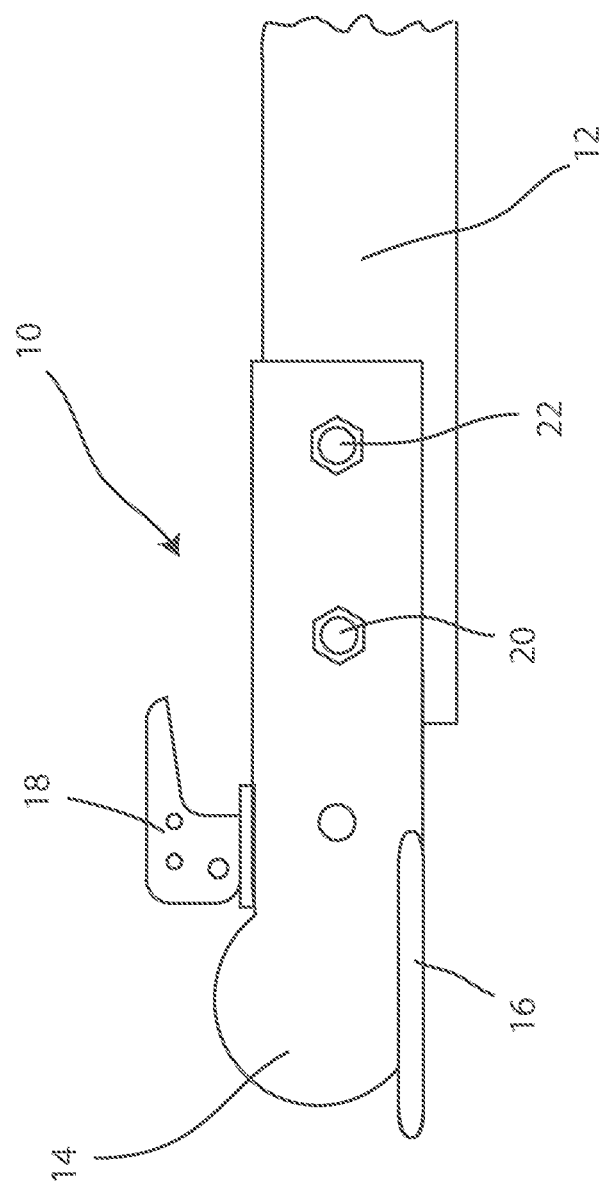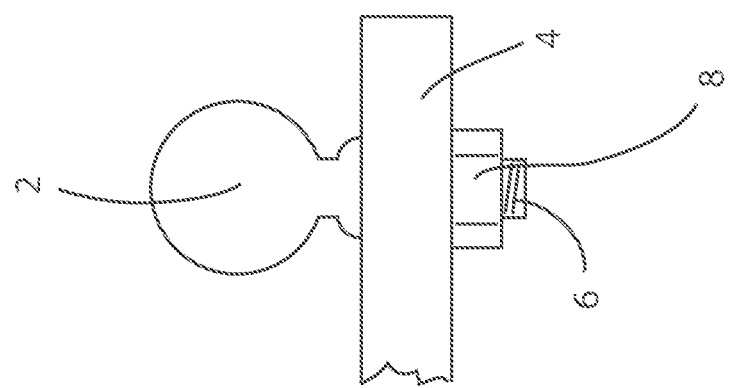
PRIOR ART
FIG. 1

VIEW A-A

VIEW B-B

SAFETY CONNECTOR APPARATUS FOR TRAILER HITCHES

This application claims the benefit of U.S. Provisional Application No. 62/849,001, filed May 16, 2019, the content of which is herein incorporated by reference in its entirety.

FIELD OF THE INVENTION

The present disclosure is directed to safety connectors for trailer hitches, in particular safety connectors to prevent a trailer from disengaging from a ball-type hitch.

BACKGROUND

Ball-type hitch assemblies are commonly used to connect a trailer to a vehicle. Such hitch assemblies us a metal ball-shaped hitch on the vehicle ("the ball"), combined with a corresponding recessed receptor on tongue of the trailer. The ball is received by the receptor on the trailer and locked into place, typically by a clamping force from a lever mechanism inside the receptor on the trailer tongue. This lever mechanism is engaged by moving a handle on the outside of the receptor between an open "up" position and a closed "down" position. The lever mechanism can also typically be locked in place through a hole at its base, allowing a pin to be inserted to prevent unlocking of the trailer, or even a padlock to provide a degree of prevention of theft by stopping unauthorized opening of the receptor.

Although ball-type hitch assemblies have been in use for many years and are quite useful and successful, they suffer from the problem of potential decoupling of the trailer if the ball and receptor do not have a proper connection. For example, during travel sometimes the lever mechanism can inadvertently work its way loose, especially if no pin is inserted in the locking hole or if the pin works its way loose. Similarly, sometimes the lever mechanism is inadvertently left open, causing the ball and receptor to only loosely connect and risking disconnection during use, such as when a bump is run over on a road. Also, this problem can occur, for example, when the ball is undersized relative to the receptor. The balls and receptors come in various sizes, and sometimes a hitch receptor that is too large for the ball is improperly used. For example, a 1 and ¾ inch ball may be improperly used with a 2 inch receptor. Such situations can lead to the hitch assembly not making proper connections, and the trailer disengaging.

Thus, a need exists for an improved hitch assembly, especially one that prevents a trailer from disconnecting when the primary ball-receptor connection fails.

SUMMARY OF THE INVENTION

The present disclosure a safety connector apparatus with a spoon safety connector. A spoon element is secured on the underside of the hitch, the spoon element including a spoon- or cup-shaped portion along with a handle. This spoon element presses up on the bottom of the ball assembly, in particular the underside where the nut and bolt are located that secure the ball to in place. The spoon element is in turn held in place by two pairs of fastening bars. These fastening bars and include bolts along with a series of holes and a pin with lock. In combination these components keep the spoon element in place on the underside of the hitch assembly. In the event that the ball becomes loose within the receptor, the spoon element 34 will keep the trailer secured to the hitch.

Other designs include spring-loaded safety assemblies, assemblies with holes in the bottom, and assemblies with spoons held in place with two arms.

A safety connector apparatus for a trailer hitch is disclosed, the safety receiver comprising:
a) a base comprising a hole for receiving the threaded base of a hitch ball;
b) side walls extending up from the base;
c) a plate having at least two holes; and
d) a bent rod extending through the two holes as well as over the top of the hitch ball; the bent locking rod being configured to move up and down above the hitch ball and to pivot away from the hitch ball to allow for insertion of a trailer hitch onto the ball;
wherein the bent rod can be positioned above the ball and trailer hitch and lowered into place and secured to prevent the trailer hitch from releasing and being removed from the ball without first releasing the bent rod.

In an embodiment, further comprising a cylinder into which an end of the bent locking rod is inserted.

In an embodiment, wherein the bent rod comprises two downward extensions for fitting into the holes on the plate.

In an embodiment, wherein the safety connector comprises two plates, each having at least two holes.

In an embodiment, wherein the safety connector comprises two plates, each having at least four holes.

In an embodiment, wherein the side walls are tapered down from a high point near the vehicle to a low point distal from the vehicle.

In an embodiment, wherein the side walls near the vehicle are taller than the side walls further from the vehicle, so as to allow the side walls near the vehicle to support the plates and bent locking rod and the side walls distal from the vehicle are shorter to allow for freedom of movement of the trailer hitch.

In an embodiment, wherein the side walls near the vehicle are at least 2 times the height of the side walls distal from the vehicle.

In an embodiment, wherein the side walls near the vehicle are at least 3 times the height of the side walls distal from the vehicle.

In an embodiment, wherein the side walls near the vehicle are at least 4 times the height of the side walls distal from the vehicle.

In an embodiment, wherein the plate includes holes for locking the plates together.

In an embodiment, wherein the bent rod has a v-shaped top when viewed from above.

In an embodiment, wherein the bent rod has a u-shaped top when viewed from above.

A safety connector apparatus for a trailer is disclosed, the safety connector comprising: a spoon element configured to be secured on the underside of the hitch, the spoon element including a spoon shaped portion and a handle, wherein the spoon shaped portion presses up on the bottom of a ball assembly when installed, in particular the underside where the nut and bolt are located that secure the ball to in place; and two pairs of fastening bars holding the spoon element in place.

The above summary of the present invention is not intended to describe each discussed embodiment of the present invention. This is the purpose of the figures and the detailed description that follows.

FIGURES

The invention may be more completely understood in connection with the following drawings, in which:

FIG. 1 shows a standard ball-style hitch components before connecting in accordance with a first construction.

Figure 2:
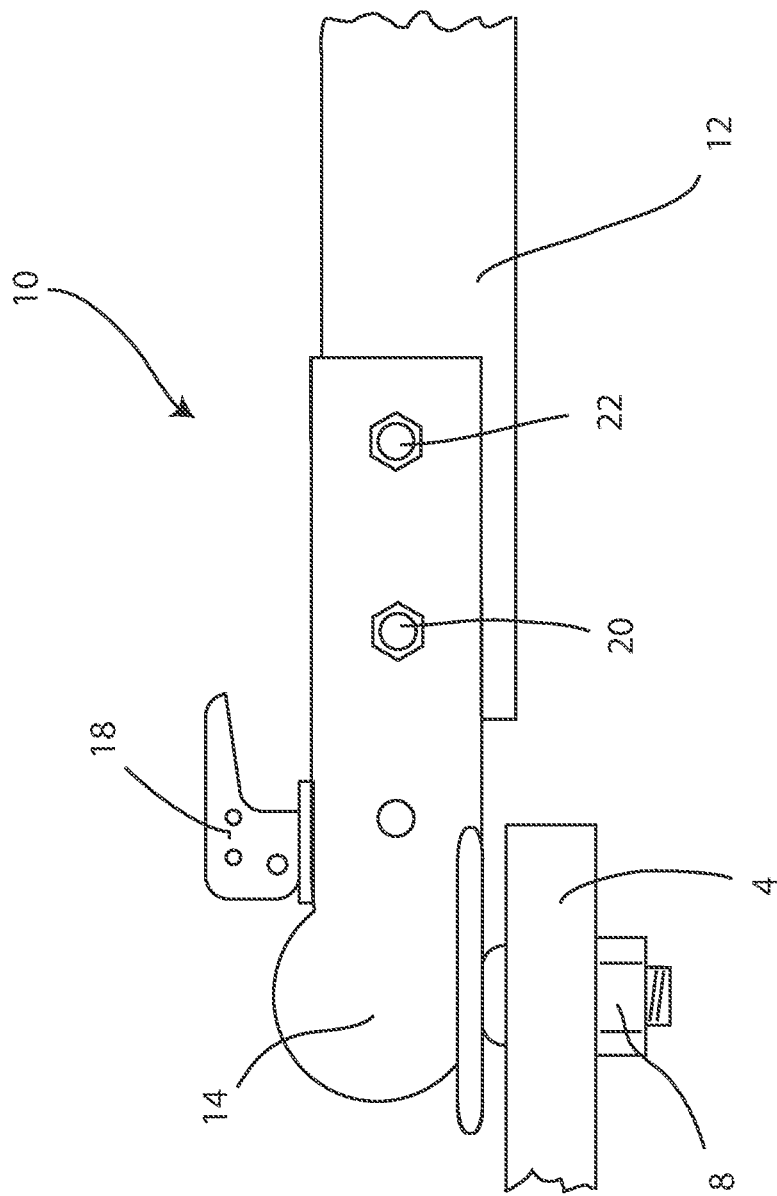
FIG. 2 shows standard ball-style hitch components after connecting in accordance with a first construction.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

Now, in reference to the drawings, FIG. 1 shows standard ball-style hitch components before connecting in accordance with a first construction. The hitch components include a ball 2 joined to a hitch extension 4 on a vehicle (not shown). The ball is secured, in the embodiment shown, to the hitch extension 4 by way of a bolt 6 extending from the bottom of the ball, and a nut 8 on the bolt 6. Thus, the ball 2 is well secured to the vehicle. The trailer hitch 10 includes a tongue 12 having a ball-receiver 14 with an open bottom area 16, along with a latching mechanism 18. In the embodiment shown the hitch 10 includes two nut and bolts 20, 22 that secure the hitch 10 to the tongue 12, although it will be understood that the hitch 10 can also be welded or otherwise connected to the tongue 12.

FIG. 2 shows standard ball-style hitch components after connecting, with the ball now within the end the ball-receiver 14. The latch mechanism 18 is shown in a down or closed position, with the interior of the hitch 10 engaging the ball to hold it securely (the latch mechanism is lifted up by rotating it 90 degrees to open the space in the ball-receiver 14 during installation and removal of the ball 2 from the ball-receiver when connecting and disconnecting the trailer from a vehicle).

Figure 3:
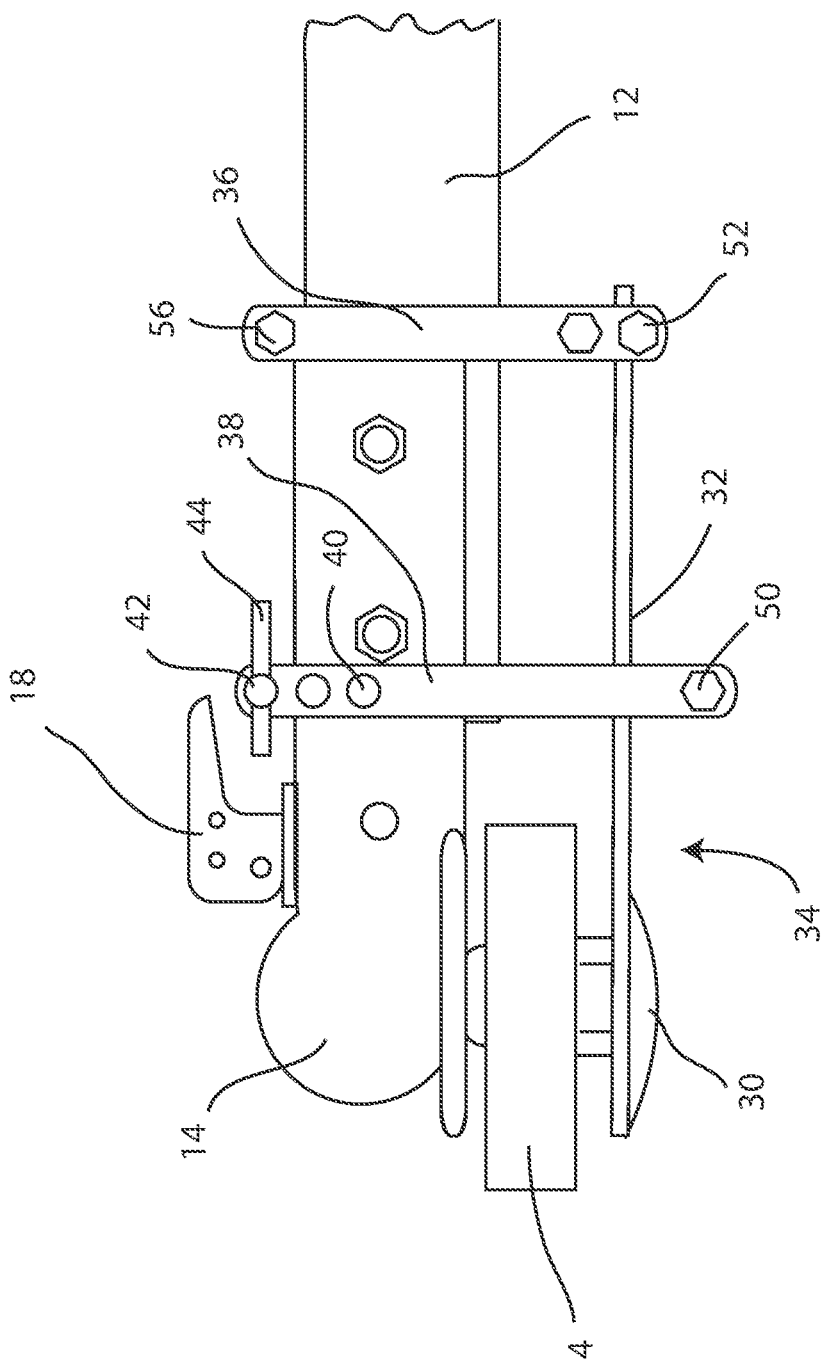
FIG. 3 shows ball-style hitch components further including a safety connector apparatus with a spoon safety connector made in accordance with the present disclosure.

As noted above, problems can arise when the ball 2 is not securely held within the receiver 14, such as when the latch mechanism 18 is left in an open or "up" position. To prevent a trailer from coming off a hitch when the ball and receiver are not properly connected, the construction of the FIG. 3 can be used. FIG. 3 shows ball-style hitch components further including a safety connector apparatus with a spoon safety connector made in accordance with the present disclosure. In FIG. 3 a spoon element 34 is secured on the underside of the hitch, the spoon element 34 including a spoon- or cup-shaped portion 30 along with a handle 32. This spoon element 34 presses up on the bottom of the ball assembly, in particular the underside where the nut and bolt are located that secure the ball to in place. The spoon element is in turn held in place by two pairs of fastening bars 36 and 38. These fastening bars 36 and 38 include bolts 50 52, 56, along with a series of holes 40 and a pin 42 with lock 44. In combination these components keep the spoon element 34 in place on the underside of the hitch assembly. In the event that the ball becomes loose within the receptor, the spoon element 34 will keep the trailer secured to the hitch.

Figure 4:
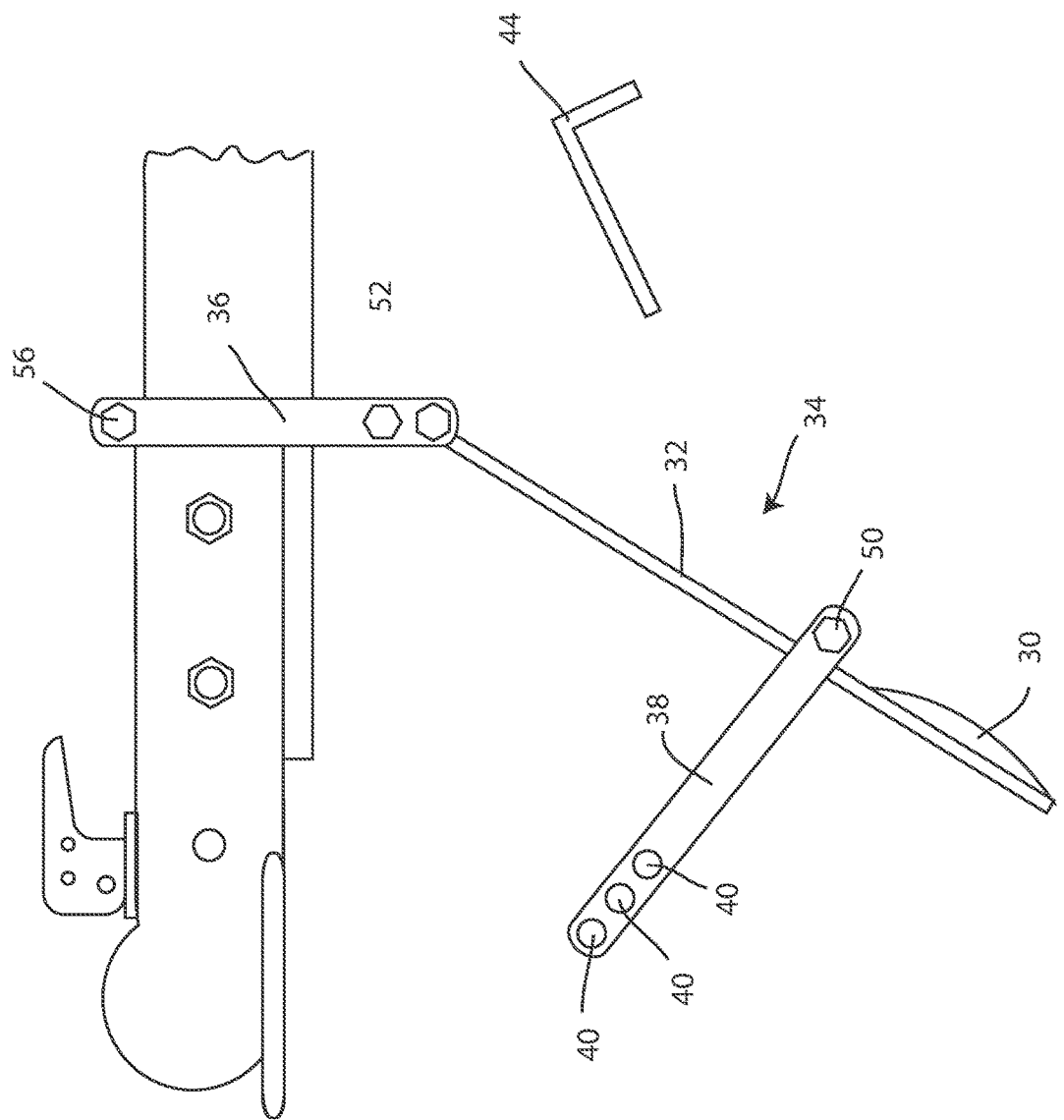
FIG. 4 shows ball-style hitch components further including a safety connector apparatus with a spoon safety connector made in accordance with the present disclosure, the spoon connector shown in an open configuration.

Now, in reference to FIG. 4, the ball-style hitch components are shown with the spoon element 34 shown in an open configuration. Here the fastening bar 38 has been released at the top by removing a pin 44 from the hole 40 that had secured it to the top of the hitch assembly. Removing of the pin from the hole allow the spoon element 34 to swing free underneath the trailer tongue, allowing the trailer to be mounted on or off the ball of a vehicle, after which the spoon element 34 can be raised back into position (if the trailer is now being attached), with the pin 44 reinserted into one of the holes 40 at the top of the fastening bar 38. Note that the fastening bar 38 has multiple holes 40 to allow for installation on various hitch constructions and balls with different lengths for the bolt securing the ball to the vehicle.

Figure 5:
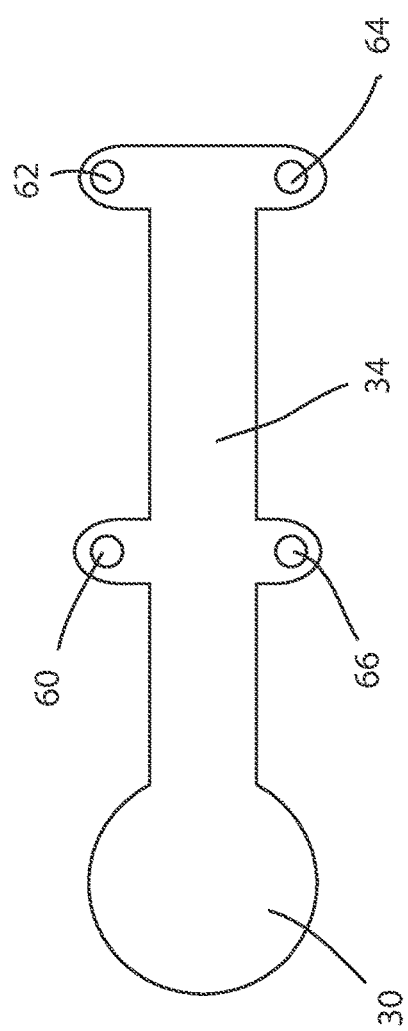
FIG. 5 shows a cut metal plate spoon safety connector prior to forming made in accordance with the present disclosure.
Figure 6:
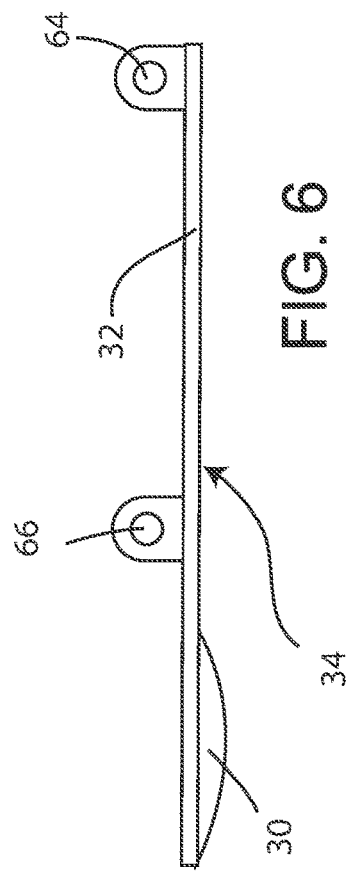
FIG. 6 shows a cut metal plate spoon safety connector after forming made in accordance with the present disclosure.

FIG. 5 shows a cut metal plate spoon safety element 34 prior to forming made in accordance with the present disclosure, including the spoon portion 30 and four tabs with holes 60, 62, 64 and 66. These tabs with holes are then bent into shape to form the final spoon element 34. FIG. 6 shows a cut metal plate spoon safety connector after forming made in accordance with the present disclosure, with spoon portion 34 (typically stamped to form a cup-shaped portion), tabs 64, 66; and handle 34.

Figure 7:
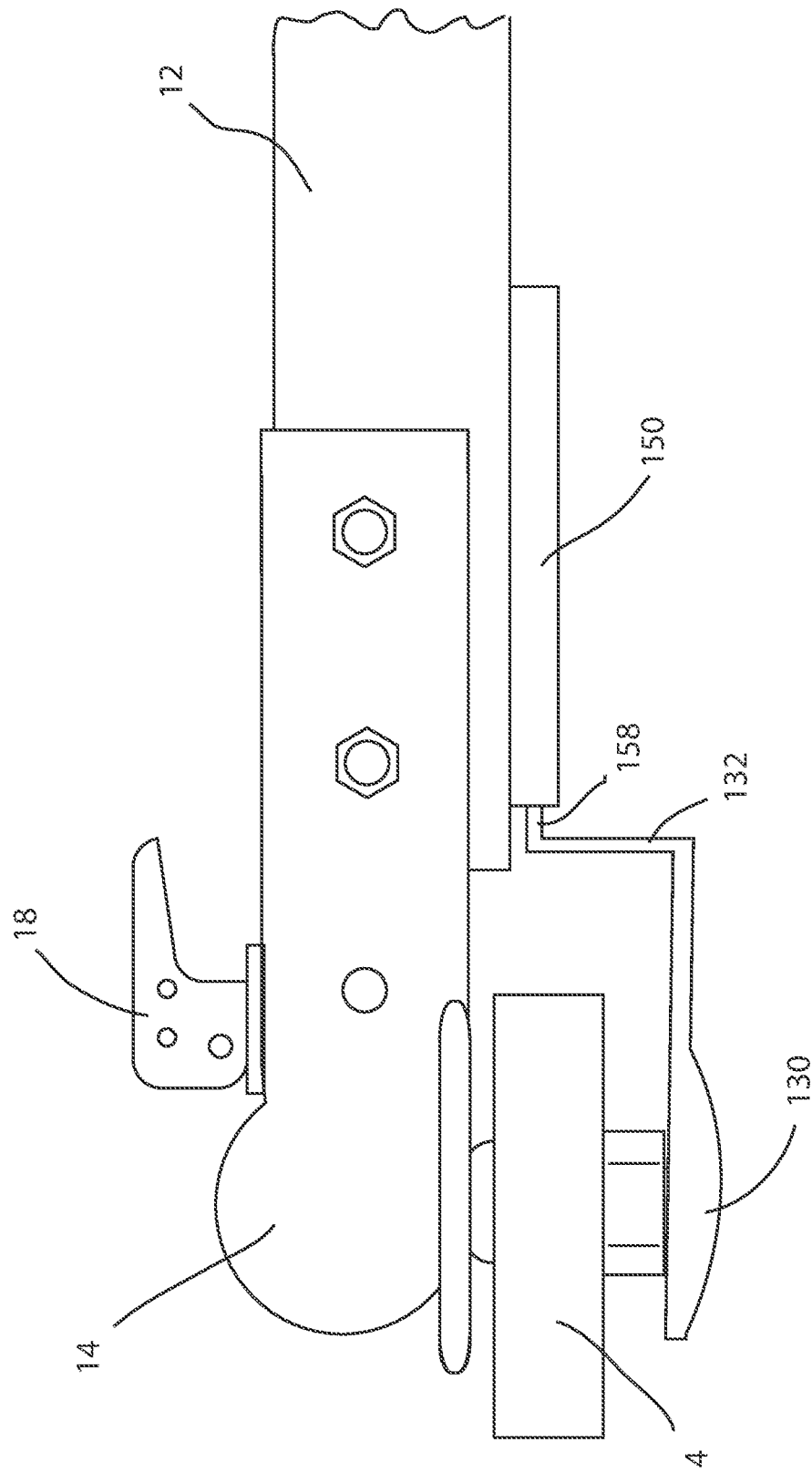
FIG. 7 shows ball-style hitch components further including a safety connector with a spring-loaded safety connector made in accordance with the present disclosure.

FIG. 7 shows an alternative construction of ball-style hitch components further including a safety connector with a spring-loaded safety element made in accordance with the present disclosure. In this construction a safety element is positioned underneath the hitch, includes a cup-shaped end 130 joined to a bent handle 132 that is positioned within a spring-loaded track 150. The end 130 is able to move back and forward for installation of the trailer by pushing the end of the handle 132, in particular, an elongated portion 158 (only shown in partial view) into and out of the spring-loaded track 150. Generally the assembly spring is biased so that the default position is a forward one in which the cub-shaped end is extended (so as to be positioned underneath the ball).

Figure 8:
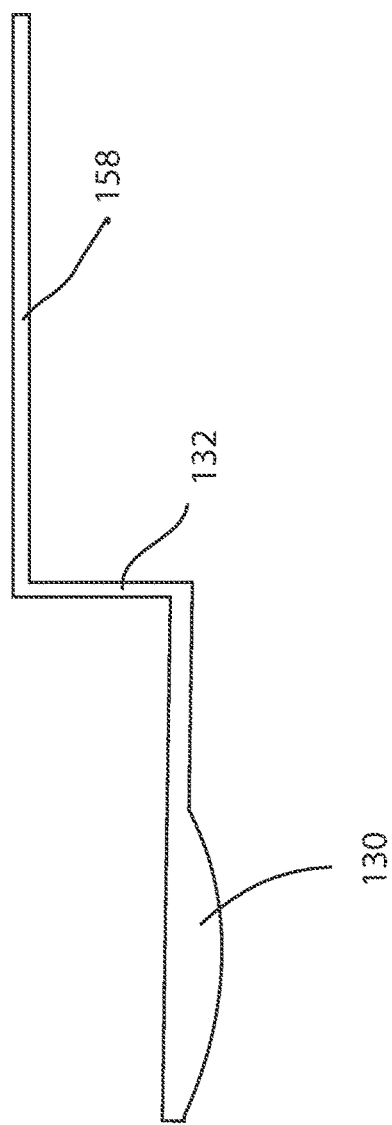
FIG. 8 shows elements of a spring-loaded safety connector made in accordance with the present disclosure, shown in side view.
Figure 9:
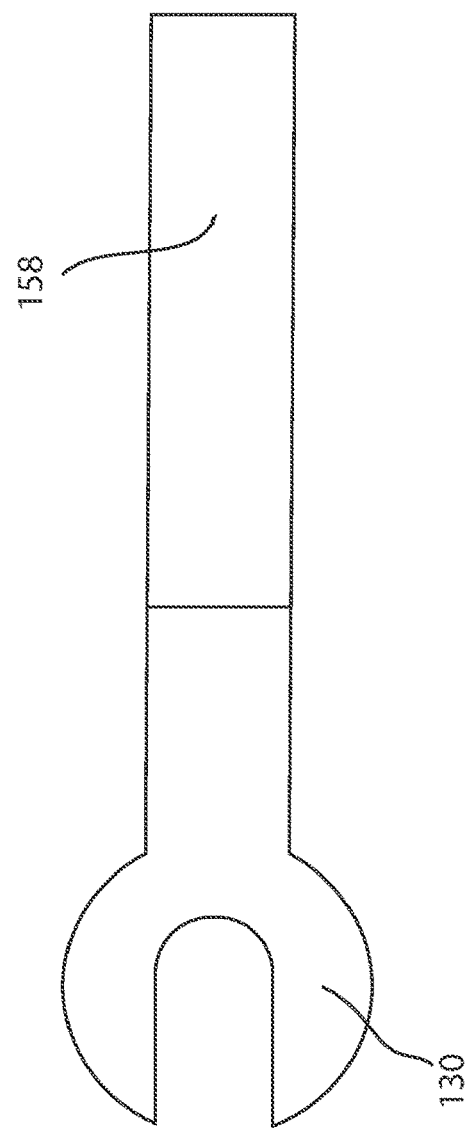
FIG. 9 shows elements of a spring-loaded safety connector made in accordance with the present disclosure, shown in top view.

FIG. 8 shows a side view of the spring-loaded safety connector made in accordance with the present disclosure. The end 130 and handle 132 are shown, along with elongate portion 158 that extends into the track 150. The end 130 can be open, like a shovel, to slide under the nut and bolt on the ball. FIG. 9 shows elements of the spring-loaded safety connector made in accordance with the present disclosure from the top. The end 130 is shown, along with elongate portion 158 that extends into the track 150.

Figure 10:
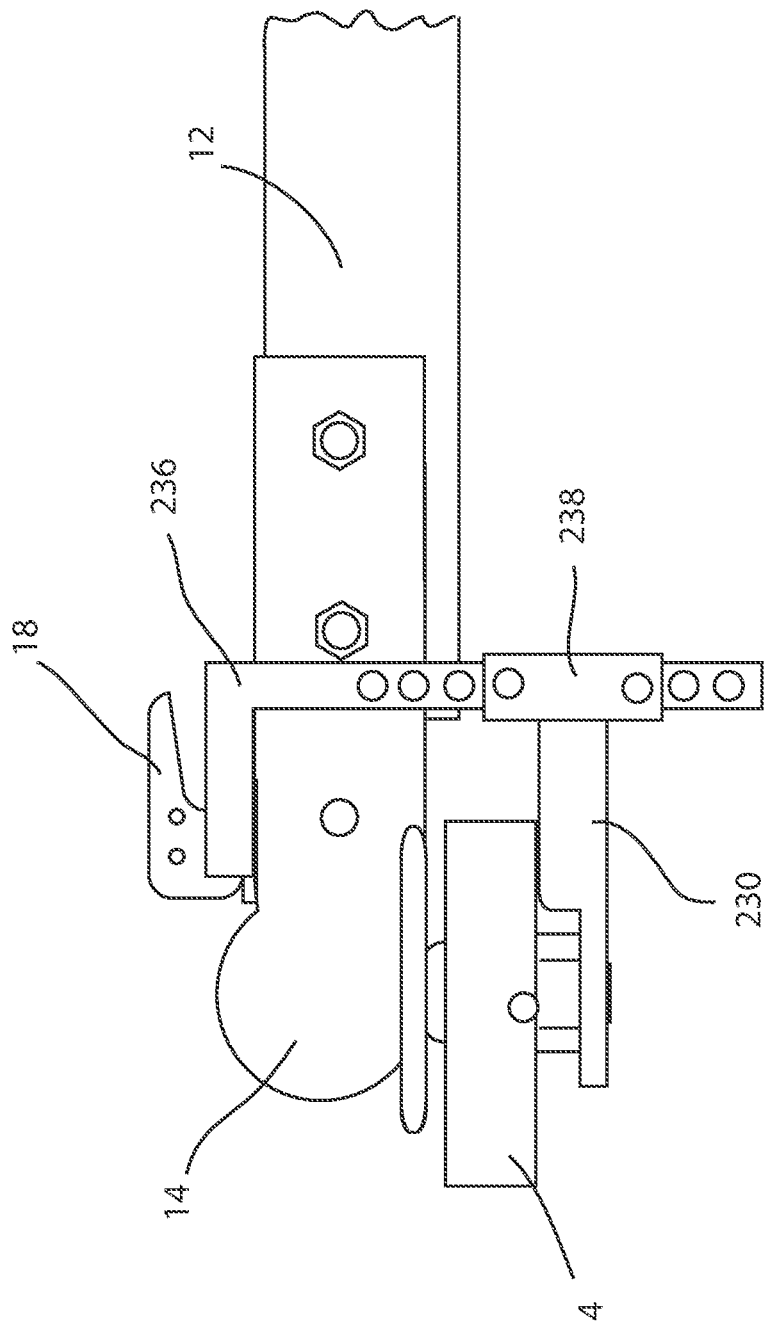
FIG. 10 shows ball-style hitch components further including a safety connector apparatus with an open-bottom safety connector made in accordance with the present disclosure, the safety connector installed on the hitch.
Figure 13:
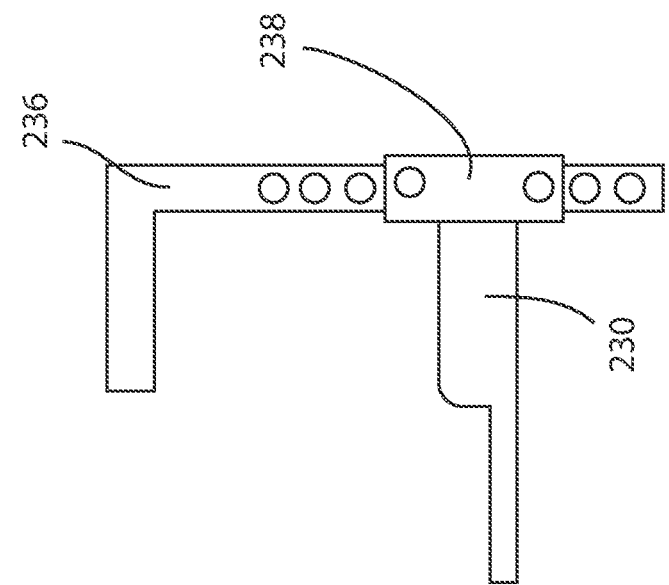
FIG. 13 shows elements of an open-bottom safety connector made in accordance with the present disclosure.
Figure 11:
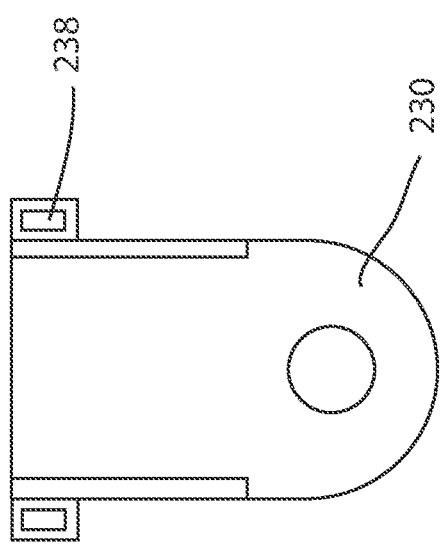
FIG. 11 shows elements of an open-bottom safety connector made in accordance with the present disclosure.
Figure 12:
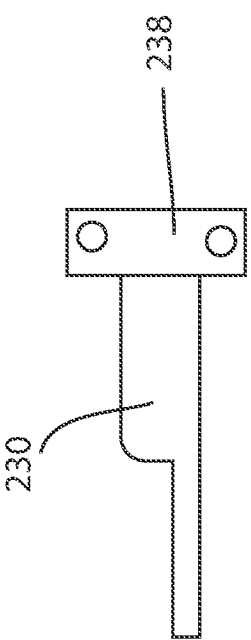
FIG. 12 shows elements of an open-bottom safety connector made in accordance with the present disclosure.

FIG. 10 shows ball-style hitch components further including a safety connector apparatus with an open-bottom safety connector made in accordance with the present disclosure, the safety connector installed on the hitch. In this design a pan 230 with a hole in it slides under the hitch and secures the bottom of the ball (the nut and bolt, in particular). In some cases the nut and bolt fit through an opening in the pan 130. The pan 230 is held in place under the tongue of the trailer with a slot and rail system, in particular a pair of slots 238 that travel along a rail 236 that extends above the hitch. The rail 238 has a plurality of holes in it through which pins can be placed to hold the pan 230 in place. This construction is more thoroughly understood by review of FIGS. 11, 12, and 13, showing the pan 230 with a hole in its interior, along with the slots 238 and the rail 236.

Figure 14:
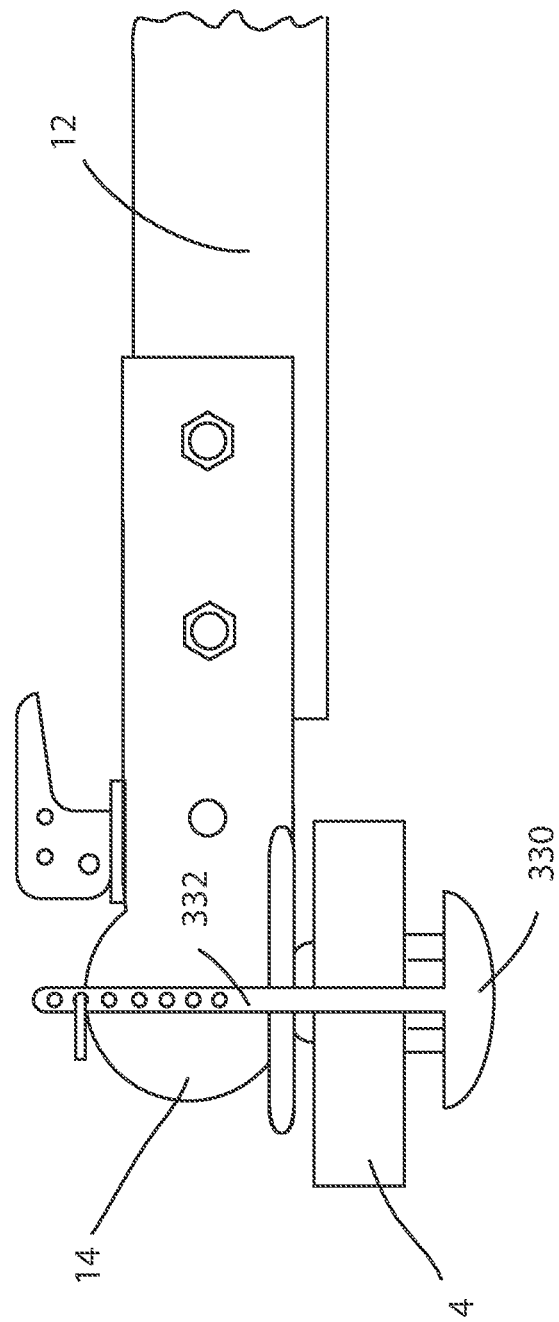
FIG. 14 shows ball-style hitch components further including a safety connector apparatus with an alternative spoon safety connector made in accordance with the present disclosure, the safety connector installed on the hitch.
Figure 16:
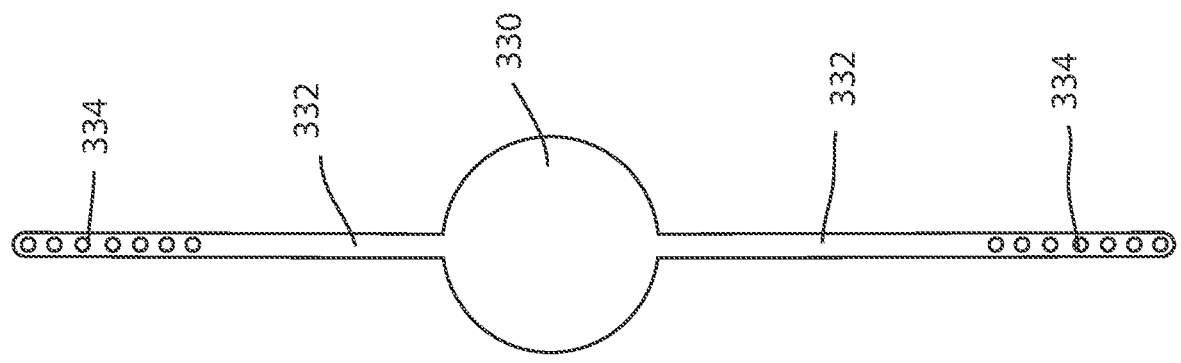
FIG. 16 shows elements of an alternative spoon safety connector made in accordance with the present disclosure.
Figure 15:
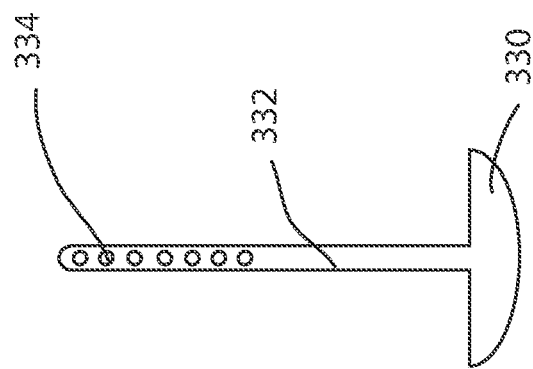
FIG. 15 shows elements of an alternative spoon safety connector made in accordance with the present disclosure.

FIG. 14 shows ball-style hitch components further including a safety connector apparatus with an alternative spoon safety connector made in accordance with the present disclosure, the safety connector installed on the hitch. A spoon 330 is held in place by two arms 332. FIG. 15 shows elements of an alternative spoon safety connector made in accordance with the present disclosure, with spoon 330, arms 332, and pin hole 334. FIG. 16 shows the elements of FIG. 15 prior to being formed. In use the spoon 330 is held underneath the ball 4 and held in place by a pin secured between the two arms (see FIG. 14).

Figure 17:
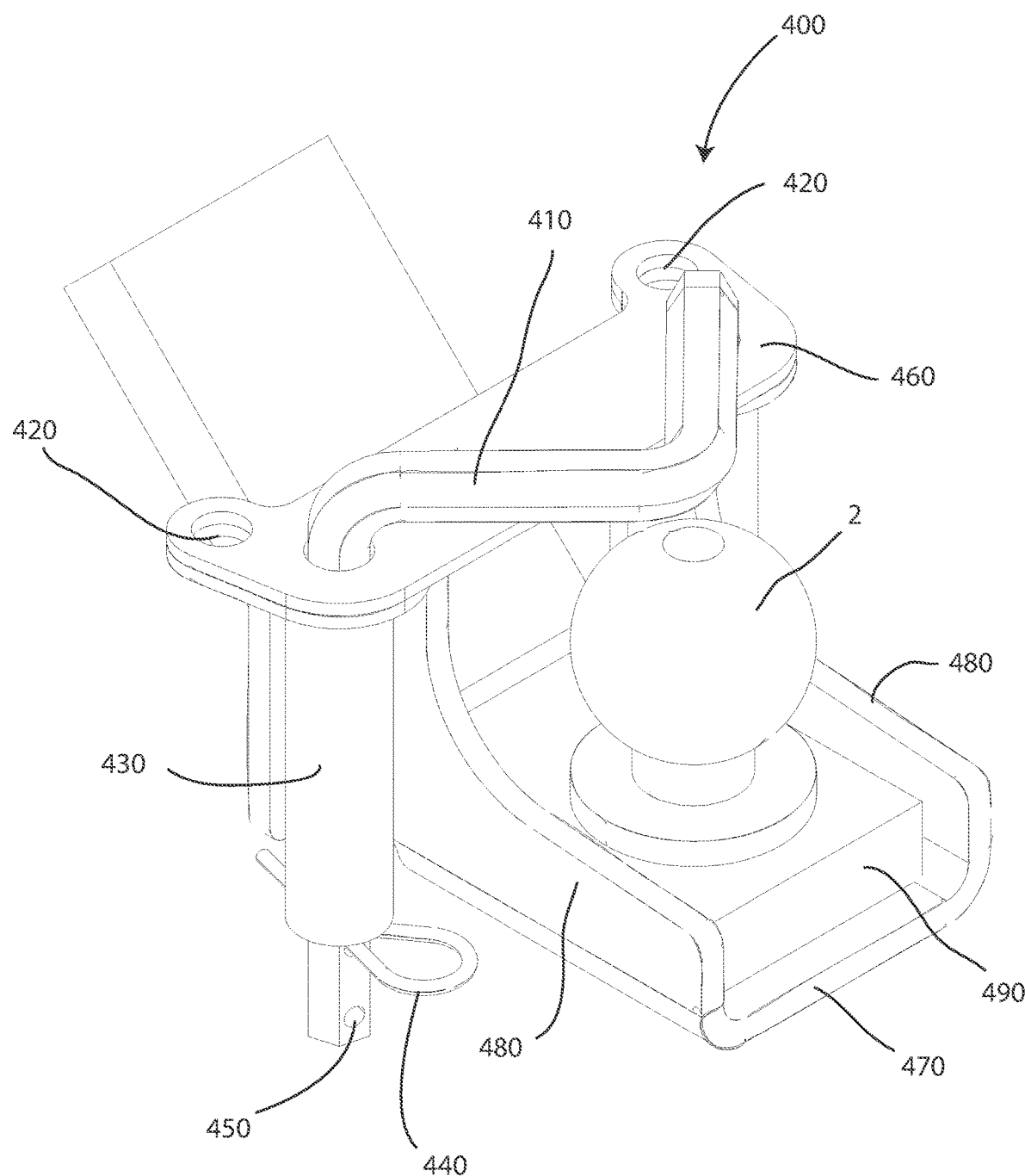
FIG. 17 shows a perspective view of an alternative safety connector made in accordance with the present disclosure.
Figure 18:
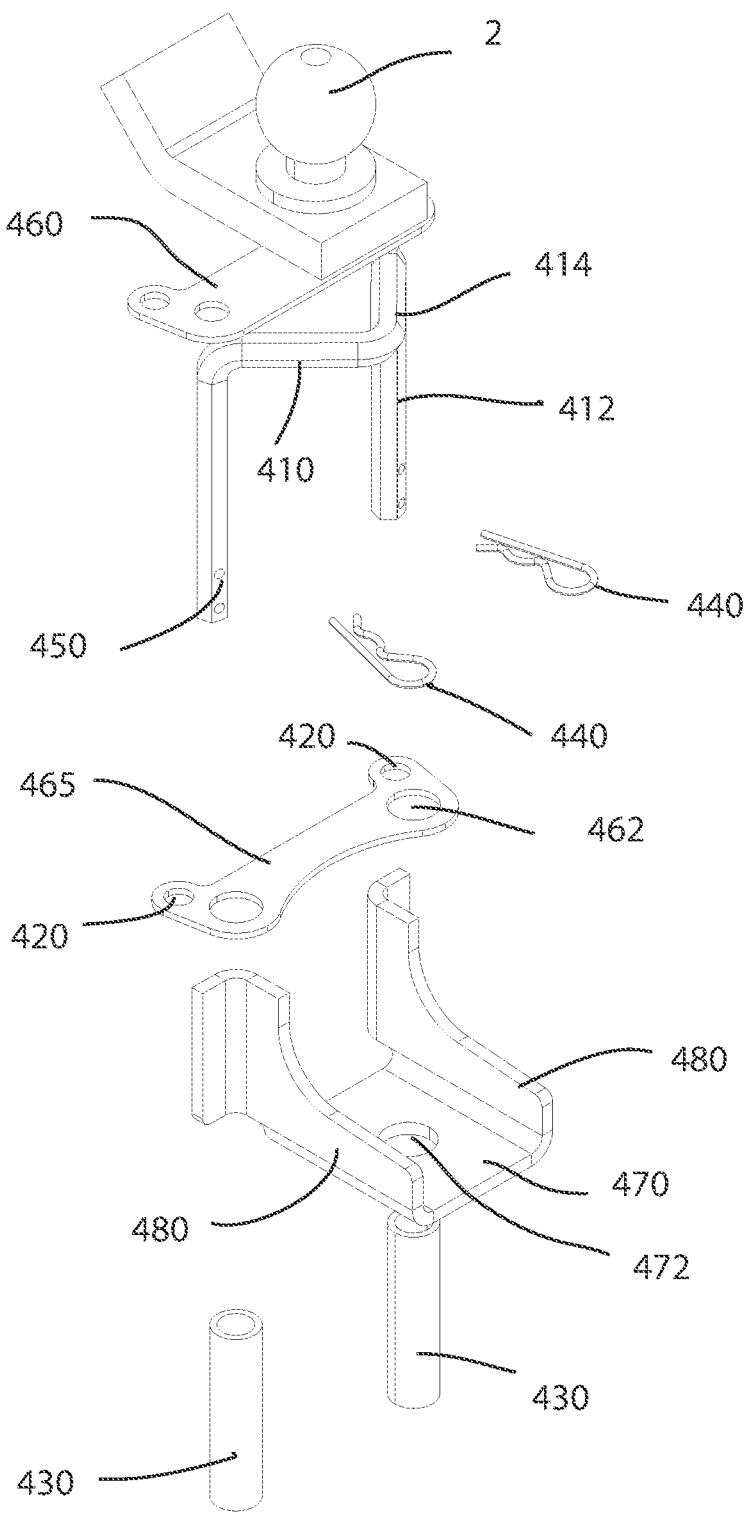
FIG. 18 shows an exploded perspective view of the safety connector of FIG. 17.

FIGS. 17 and 18 show an alternative design for securing a hitch 400 onto a ball, with bent rod 410 that secures the top of the trailer hitch receiver (not shown). The locking rod 410 can be, for example, hexagonal in cross section, and include two down sections 412 connected by an upper portion 414. The down sections 412 include holes 450 into which pins 440 can be inserted. The down sections fit through one or more plates with receiver holes. Plates 460 and 465 are shown in the example embodiment, and also extend down through cylinders 430 in the depicted embodiment. The plates include, for example, holes 420 and 462. The larger hole 462 is only in plate 465 and provides a receiving location for cylinder 430. Also, the device includes a bottom plate 470 with hole 472 (for the ball to be secured through), the tongue receiver 470 including side walls 480.

In use the locking rod 410 can be raised and lowered, as well as pivot out of the way, to install a hitch into a ball. Thereafter the locking rod 410 is lowered onto the ball and locked into place using pins 440. Multiple holes 450 are typically present to allow for a variety of set heights for the rod 410. The design allows for the bottom plate 470 to be installed over the hitch bar 490 and be held in place by the nut holding the ball 2 in place on the underside of the hitch bar 490. As such, even if the bolt falls off the device will be kept in place because the rod 410 is drawn down over the ball and held in place between the rod 410 and the bottom plate 470 by way of the rod 410.

Figure 19:
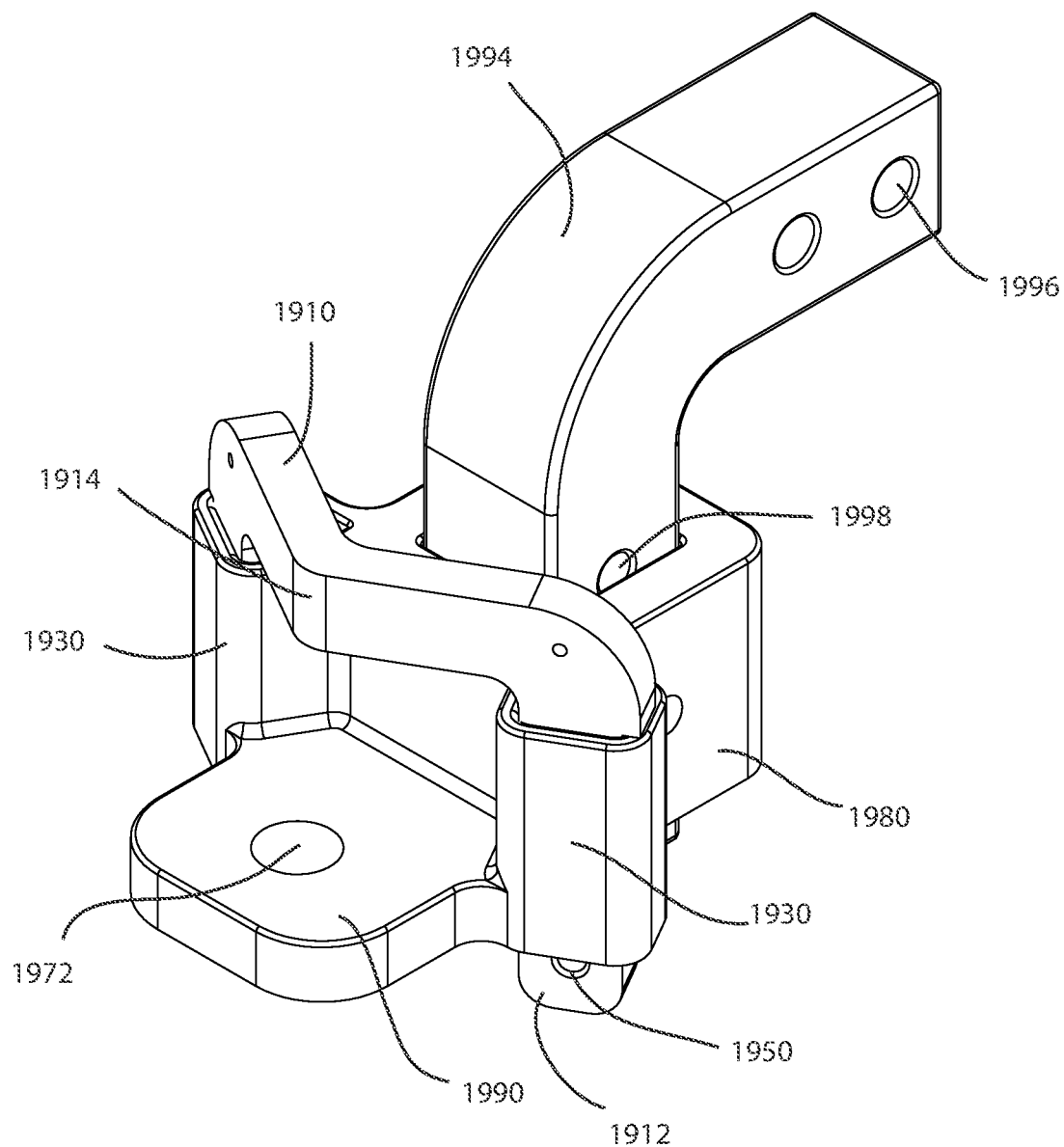
FIG. 19 shows a perspective view of an alternative safety connector made in accordance with the present disclosure.
Figure 20:
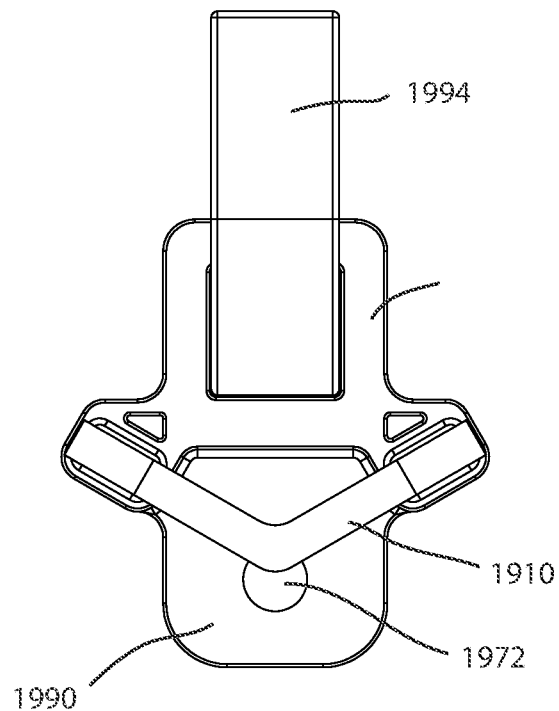
FIG. 20 shows a top view of the alternative safety connector of FIG. 19.
Figure 21:
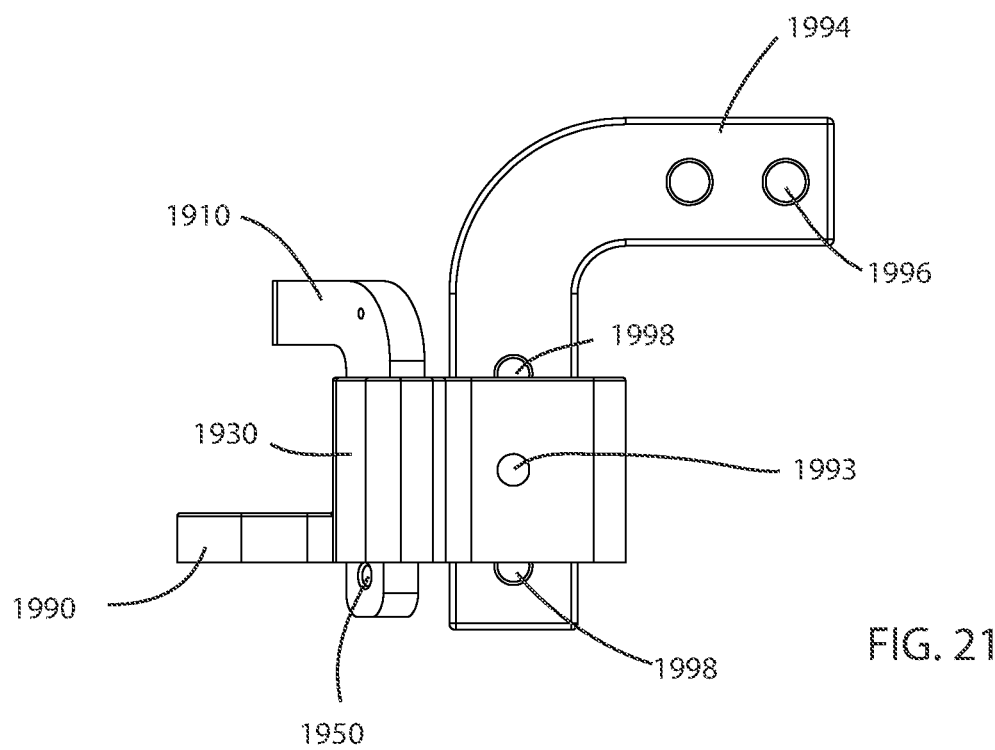
FIG. 21 shows a side view of the alternative safety connector of FIG. 19.
Figure 22:
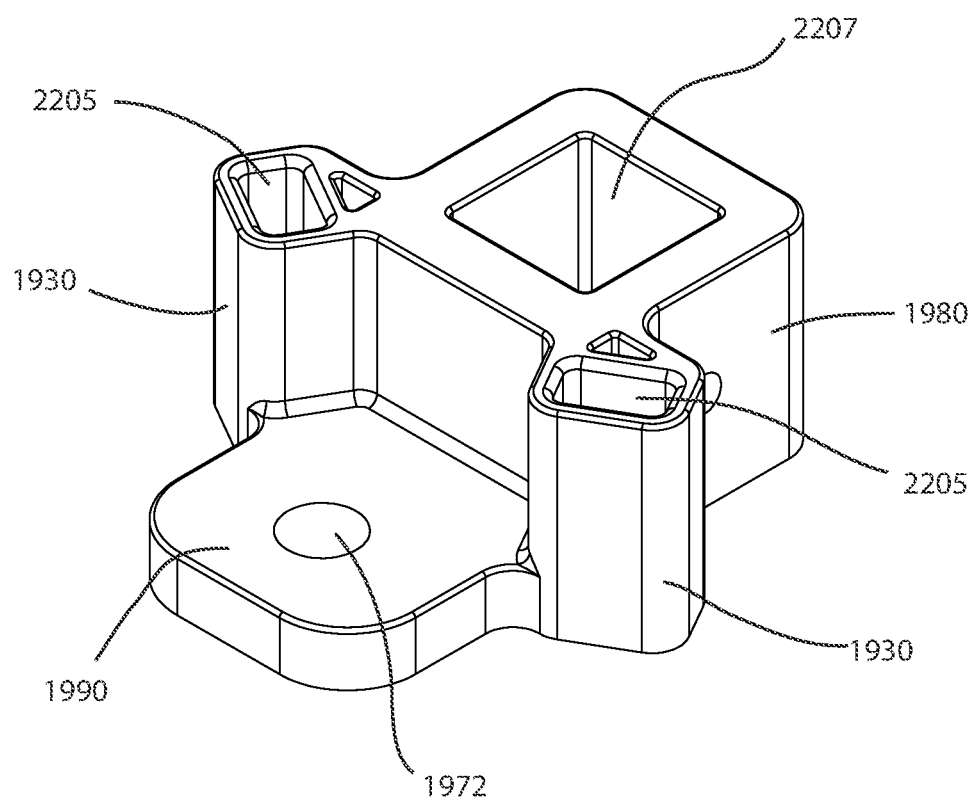
FIG. 22 shows a partial perspective view of the alternative safety connector of FIG. 19

FIG. 19 shows a perspective view of an alternative safety connector made in accordance with the present disclosure, and FIGS. 20 to 22 show additional views of that safety connector. The safety connector includes a base portion 1980 that secures to a hitch adapter 1994, the hitch adapter 1994 that has holes 1996 for locking to a vehicle and holes 1998 for securing and controlling height of the base portion 1980. The safety connector includes a locking rod 1910 that secures the top of the trailer hitch receiver (not shown). The locking rod 1910 can be, for example, rectangular in cross section, and include two down sections 1912 connected by an upper portion 1914 that is designed to substantially be centered over the ball (not shown). Down sections 1912 fit into receivers 1930, and include holes 1950 into which pins can be inserted to hold the locking rod in place (and thereby hold the trailer in place on the ball). Receiver slots 2205 (see FIG. 22) in the receivers 1930 receive the down sections 1912 of the locking rod 1910. In use the locking rod 1910 can be raised and lowered to install a hitch into a ball. Thereafter the locking rod 1910 is lowered onto the ball (not shown) and locked into place using pins. Multiple holes 1950 are typically present to allow for a variety of set heights for the rod 1910. The ball is secured to platform 1990 by locking it through hole 1972. Hole 1972 can be designed with an elongate opening to adjust position of the ball underneath the locking rod 1910. FIG. 20 shows a top view of the alternative safety connector of FIG. 19; and FIG. 21 shows a side view of the alternative safety connector of FIG. 19, and shows a hole 1993 for placing a pin into hole 1998 of hitch adapter 1994. FIG. 22 shows a partial perspective view of the alternative safety connector of FIG. 19, showing the connector removed from hitch adapter 1994, with opening 2207 in base portion 1980 depicted.

Figure 23:
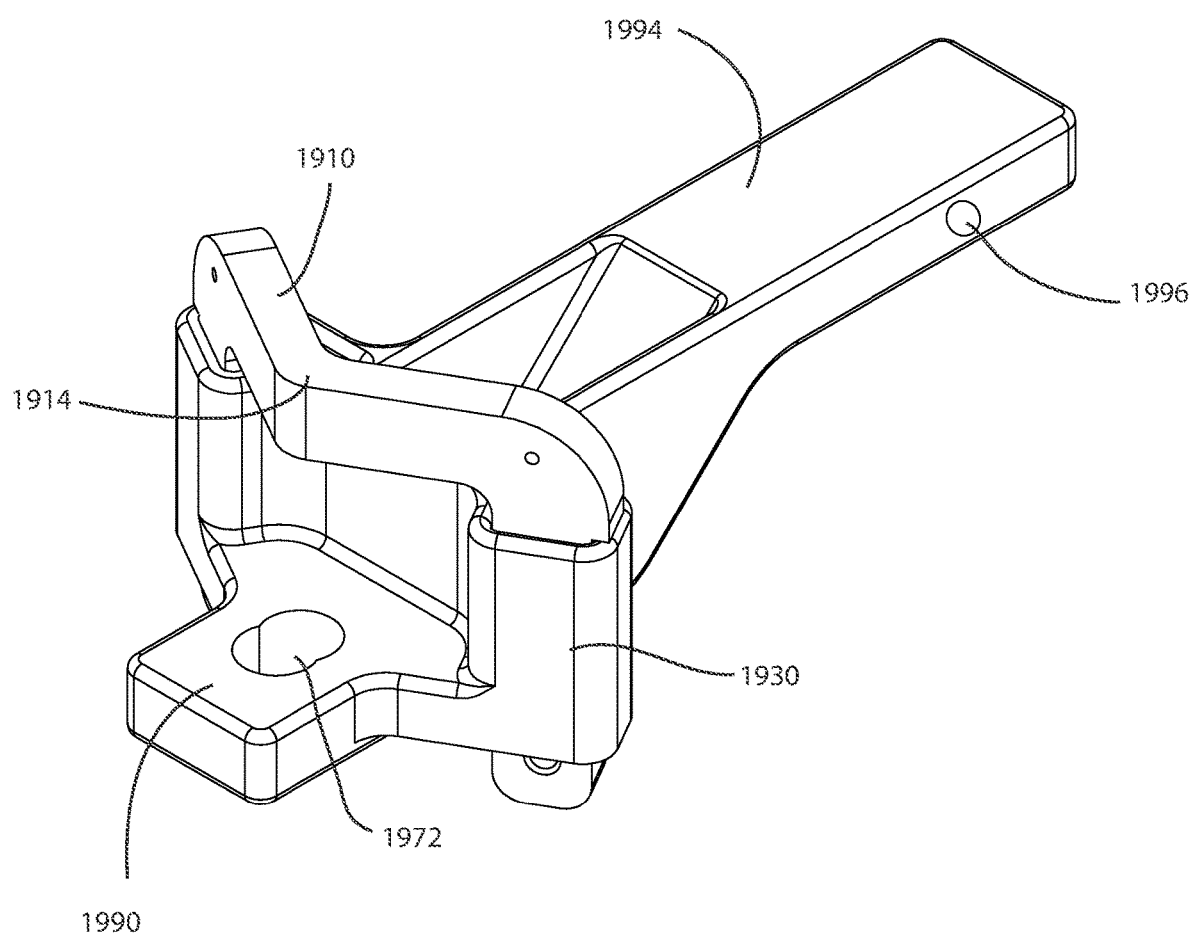
FIG. 23 shows a perspective view of an alternative safety connector made in accordance with the present disclosure.

FIG. 23 shows a perspective view of an alternative safety connector made in accordance with the present disclosure, this design having a unitary construction compared to the embodiment of FIGS. 19 to 22.

Figure 24:
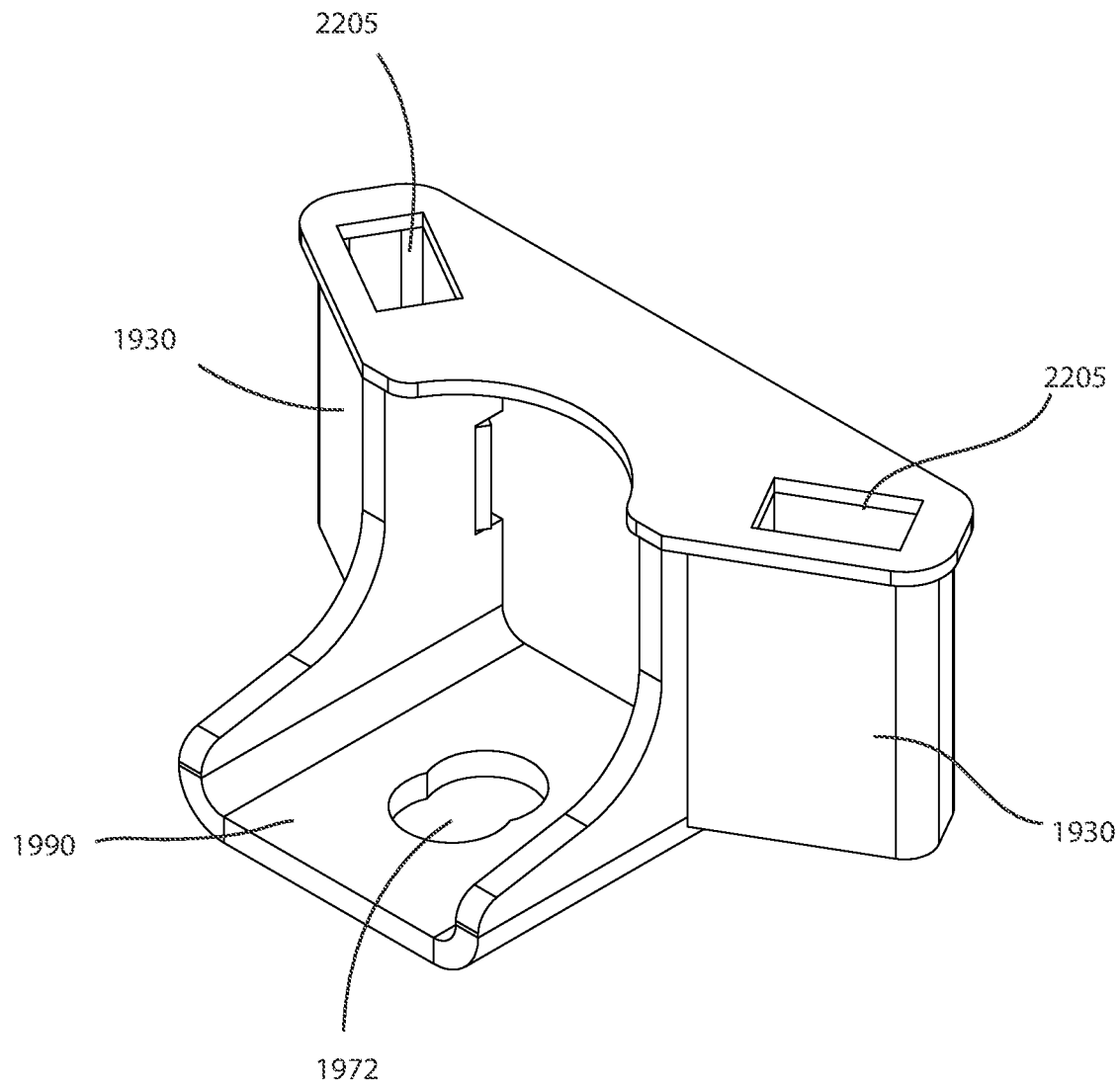
FIG. 24 shows a perspective view of an alternative safety connector made in accordance with the present disclosure.

FIG. 24 shows a perspective view of an alternative safety connector made in accordance with the present disclosure, having a retrofit design for existing hitch assemblies.

Figure 25:
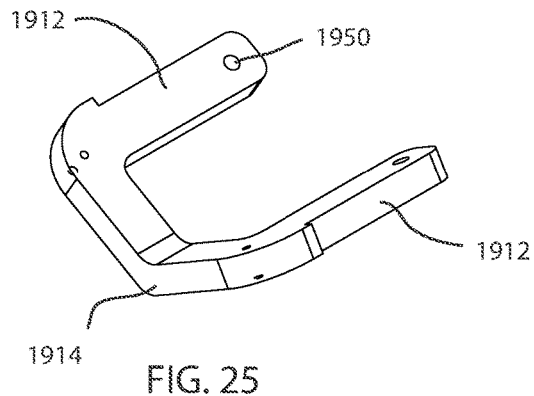
FIG. 25 shows a perspective view of a locking rod constructed in accordance with the present disclosure
Figure 26:
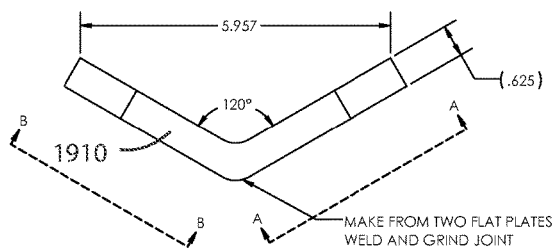
FIG. 26 shows a top view of the locking rod of FIG. 25.
Figure 27:
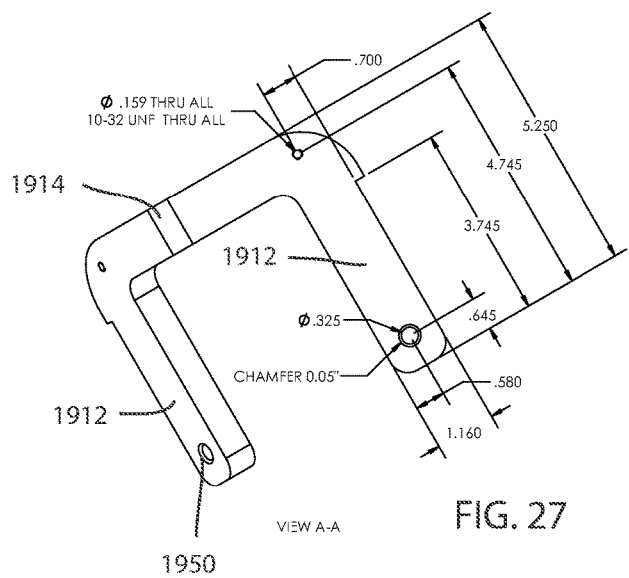
FIG. 27 shows a view of a locking rod taken from position A-A of FIG. 26.
Figure 28:
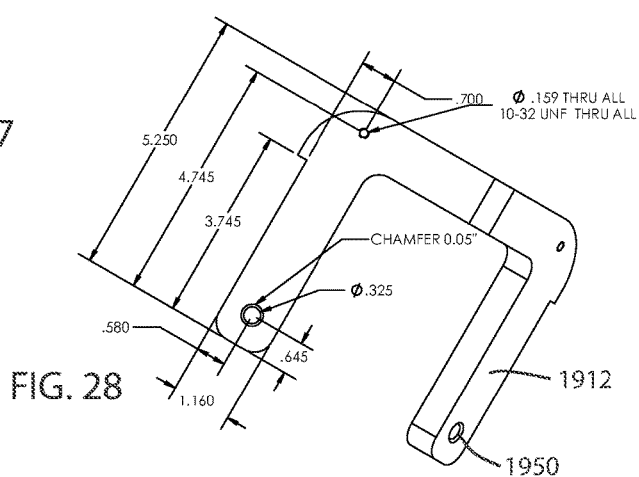
FIG. 28 shows a view of a locking rod taken from position B-B of FIG. 26.

FIG. 25 shows a perspective view of a locking rod constructed in accordance with the present disclosure. FIG. 26 shows a top view of the locking rod of FIG. 25. FIG. 27 shows a view of a locking rod taken from position A-A of FIG. 26. FIG. 28 shows a view of a locking rod taken from position B-B of FIG. 26. The units are in inches. Generally distances can be 5 percent greater or lesser than the units shown, optionally 10 percent greater or lesser than the units shown, optionally 25 percent greater or lesser than the units shown.

While the present invention has been described with reference to several particular implementations, those skilled in the art will recognize that many changes may be made hereto without departing from the spirit and scope of the present invention.

We claim:

1. A safety connector apparatus for a trailer hitch, the safety connector comprising:
   a) a base comprising a hole for receiving the threaded base of a hitch ball and side walls;
   b) a locking rod extending through the hole as well as over the top of the hitch ball; the locking rod being configured to move up and down above the hitch ball and to pivot away from the hitch ball to allow for insertion of a trailer hitch onto the ball;
   wherein the locking rod can be positioned above the ball and trailer hitch and lowered into place and secured to prevent the trailer hitch from releasing and being removed from the ball without first releasing the locking rod; and
   wherein the side walls near the vehicle are taller than the side walls further from the vehicle, so as to allow the side walls near the vehicle to support the locking rod and the side walls distal from the vehicle are shorter to allow for freedom of movement of the trailer hitch.

2. The safety connector of claim 1, further comprising a cylinder into which an end of the locking rod is inserted.

3. The safety connector of claim 1, wherein the locking bent rod comprises two downward extensions.

4. The safety connector of claim 1, wherein the safety connector comprises two plates, each having at least four holes.

5. The safety connector of claim 1, wherein the side walls are tapered down from a high point near the vehicle to a low point distal from the vehicle.

6. The safety connector of claim 1, wherein the side walls near the vehicle are at least 2 times the height of the side walls distal from the vehicle.

7. The safety connector of claim 6 wherein the side walls near the vehicle are at least 3 times the height of the side walls distal from the vehicle.

8. The safety connector of claim 6, wherein the side walls near the vehicle are at least 4 times the height of the side walls distal from the vehicle.

9. The safety connector of claim 1, wherein the locking rod has a v-shaped top when viewed from above.

10. The safety connector of claim 1, wherein the locking rod has a u-shaped top when viewed from above.

* * * * *